United States Patent
Hamadate et al.

(10) Patent No.: US 12,031,757 B2
(45) Date of Patent: Jul. 9, 2024

(54) REFRIGERANT PIPE AND REFRIGERATION APPARATUS

(71) Applicant: DAIKIN INDUSTRIES, LTD., Osaka (JP)

(72) Inventors: Junichi Hamadate, Osaka (JP); Yoshihiro Teramoto, Osaka (JP); Masanori Jindou, Osaka (JP); Hiroaki Matsuda, Osaka (JP); Masato Okuno, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 186 days.

(21) Appl. No.: 17/585,857

(22) Filed: Jan. 27, 2022

(65) Prior Publication Data

US 2022/0146162 A1    May 12, 2022

Related U.S. Application Data

(63) Continuation of application No. PCT/JP2020/024480, filed on Jun. 23, 2020.

(30) Foreign Application Priority Data

Jul. 31, 2019   (JP) .................. 2019-140943
Dec. 25, 2019   (JP) .................. 2019-234195

(51) Int. Cl.
  *F16L 33/08*   (2006.01)
  *F16L 13/08*   (2006.01)
  *F25B 41/40*   (2021.01)

(52) U.S. Cl.
  CPC .............. *F25B 41/40* (2021.01); *F16L 13/08* (2013.01)

(58) Field of Classification Search
  CPC ........ F25B 41/40; F16L 13/08; F16L 25/0072; F16L 13/007
  See application file for complete search history.

(56) References Cited

U.S. PATENT DOCUMENTS 260,580 A  *  7/1882  Knight .................... F16L 13/08
                                        285/285.1
300,005 A  *  6/1884  Patterson .............. F16L 13/08
                                        285/289.1

(Continued)

FOREIGN PATENT DOCUMENTS

CN    104015019 A    9/2014
CN    106555910 A    4/2017

(Continued)

OTHER PUBLICATIONS

English Translation of International Preliminary Report on Patentability issued in corresponding International Application PCT/JP2020/024480 dated Feb. 1, 2022 (6 pages).

(Continued)

*Primary Examiner* — Zachary T Dragicevich
*Assistant Examiner* — James A Linford
(74) *Attorney, Agent, or Firm* — Osha Bergman Watanabe & Burton LLP

(57) ABSTRACT

A refrigerant pipe that constitutes a refrigerant circuit of a refrigeration apparatus includes: a first pipe; and a second pipe. The first pipe includes a pipe body made of stainless steel; and a connection pipe, made of a material different from stainless steel, disposed at an end of the pipe body in a pipe axial direction. The connection pipe includes a protrusion protruding in the pipe axial direction from the end of the pipe body. The second pipe includes: a second-pipe large diameter portion, made of a material that is a same as the material of the connection pipe, disposed at an end in the pipe axial direction; a second-pipe small diameter portion (Continued)

having a smaller diameter than the second-pipe large diameter portion; and a step portion disposed between the second-pipe large diameter portion and the second-pipe small diameter portion.

13 Claims, 11 Drawing Sheets

(56) References Cited

U.S. PATENT DOCUMENTS

| | | | | |
|---|---|---|---|---|
| 468,298 | A * | 2/1892 | White et al. | F16L 13/08 |
| | | | | 285/289.1 |
| 909,725 | A * | 1/1909 | Williams | F16L 13/08 |
| | | | | 285/285.1 |
| 986,164 | A * | 3/1911 | Glennan | F16L 13/08 |
| | | | | 285/422 |
| 3,205,573 | A | 9/1965 | Seal et al. | |
| 6,041,014 | A | 3/2000 | Atsumi et al. | |
| 8,876,425 | B2 | 11/2014 | Wilson | |
| 2014/0016995 | A1 * | 1/2014 | Wilson | F16L 13/007 |
| | | | | 156/60 |
| 2016/0290741 | A1 * | 10/2016 | Boyd | B23K 1/0012 |
| 2016/0312923 | A1 | 10/2016 | Shi | |

FOREIGN PATENT DOCUMENTS

| | | |
|---|---|---|
| JP | S57-54782 U | 3/1982 |
| JP | S61-37484 U | 3/1986 |
| JP | H05-094593 U | 12/1993 |
| JP | 2010-151327 A | 7/2010 |
| JP | 2016-205610 A | 12/2016 |
| JP | 2017137961 A | 8/2017 |

OTHER PUBLICATIONS

Extended European Search Report issued in corresponding European Patent Application No. 20848285.1, dated Aug. 5, 2022 (8 pages).

International Search Report issued in corresponding International Application No. PCT/JP2020/024480 mailed Sep. 8, 2020 (3 pages).

* cited by examiner

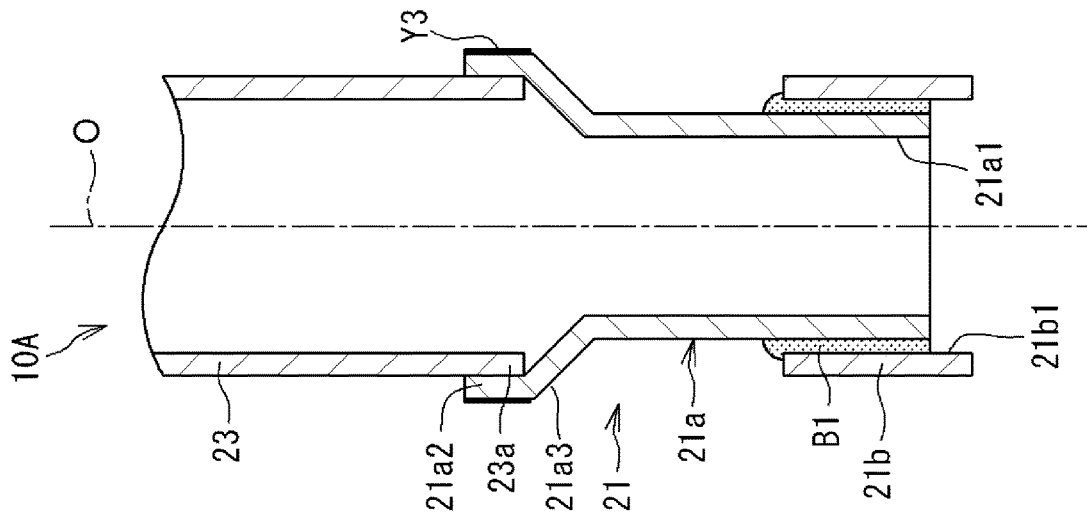
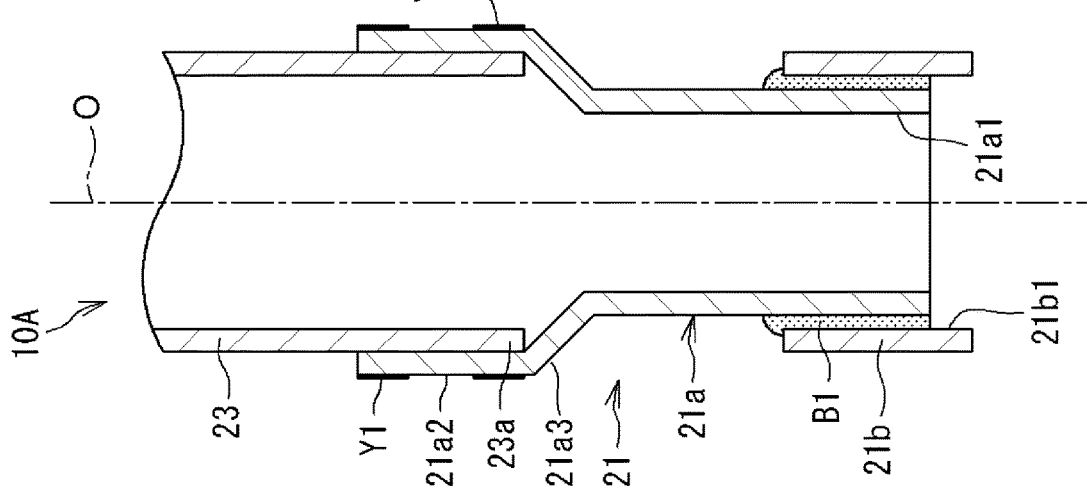
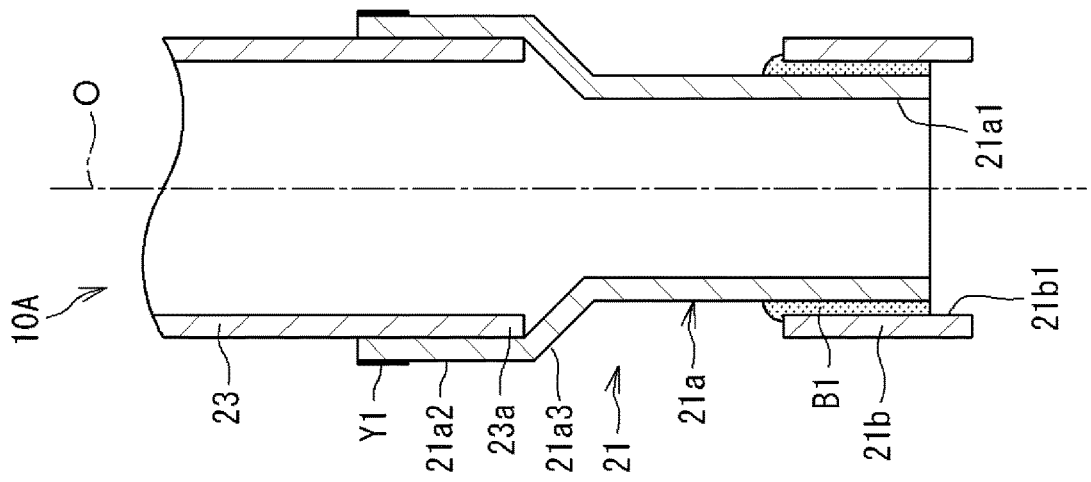

FIG. 7A
FIG. 7B
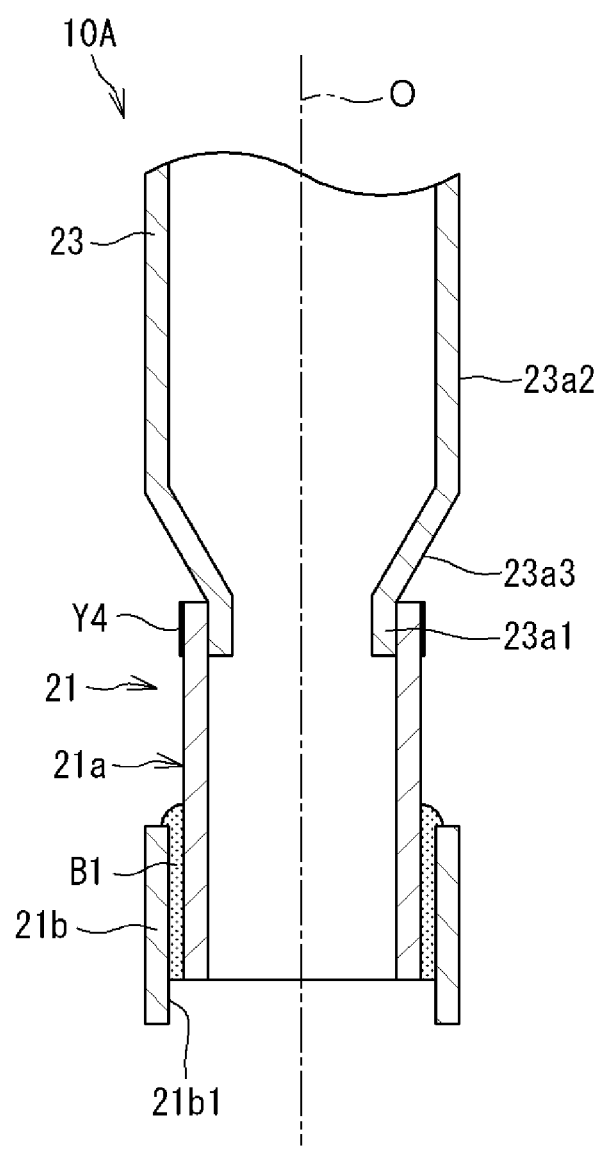
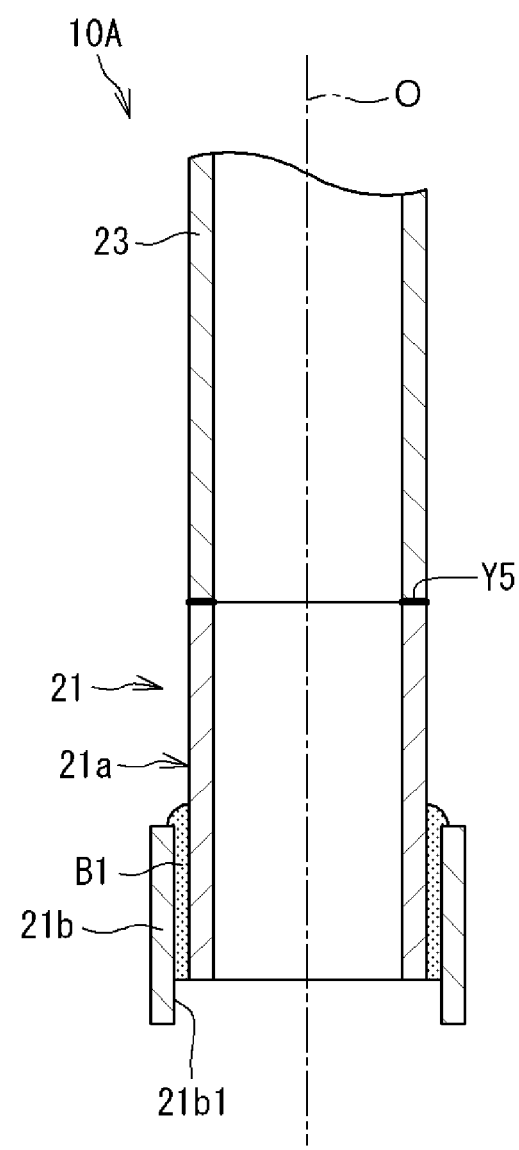

REFRIGERANT PIPE AND REFRIGERATION APPARATUS

TECHNICAL FIELD

The present disclosure relates to a refrigerant pipe and a refrigeration apparatus.

BACKGROUND

A heat-pump refrigeration apparatus such as an air conditioner includes a refrigerant circuit formed by connecting, with a refrigerant pipe, element components such as a compressor, an oil separator, a four-way switching valve, a heat source-side heat exchanger, an expansion mechanism, a usage-side heat exchanger, an accumulator, and a shutoff valve. In general, a copper pipe is used for the refrigerant pipe. However, since a material cost of a copper pipe is high, it is considered to use a relatively inexpensive stainless steel refrigerant pipe (see, for example, Patent Literature 1).

PATENT LITERATURE

Patent Literature 1: Japanese Unexamined Patent Publication No. 2010-151327

SUMMARY

A refrigerant pipe of the present disclosure constitutes a refrigerant circuit of a refrigeration apparatus, the refrigerant pipe including a first pipe and a second pipe, in which the first pipe includes a pipe body including stainless steel and a connection pipe provided at an end of the pipe body in a pipe axial direction and including a material different from stainless steel, the connection pipe has a protrusion protruding in the pipe axial direction from the end of the pipe body, the second pipe includes a second large diameter portion including a material that is same as the material of the connection pipe and disposed at an end in the pipe axial direction, a second small diameter portion having a smaller diameter than the second large diameter portion, and a step portion disposed between the second large diameter portion and the second small diameter portion, the connection pipe is inserted into the second large diameter portion, the protrusion is in contact with the step portion, and the connection pipe has an outer peripheral surface connected to an inner peripheral surface of the second large diameter portion.

BRIEF DESCRIPTION OF THE DRAWINGS

FIGS. 6A, 6B, and 6C are sectional views illustrating a modification of the pipe body.

FIGS. 7A and 7B are sectional views illustrating a further modification of the pipe body.

DETAILED DESCRIPTION

Hereinafter, embodiments of the present disclosure will be described in detail with reference to the accompanying drawings.

[Overall Configuration of Refrigeration Apparatus]

The embodiments of the present disclosure will be described below with reference to the drawings.

Figure 1:
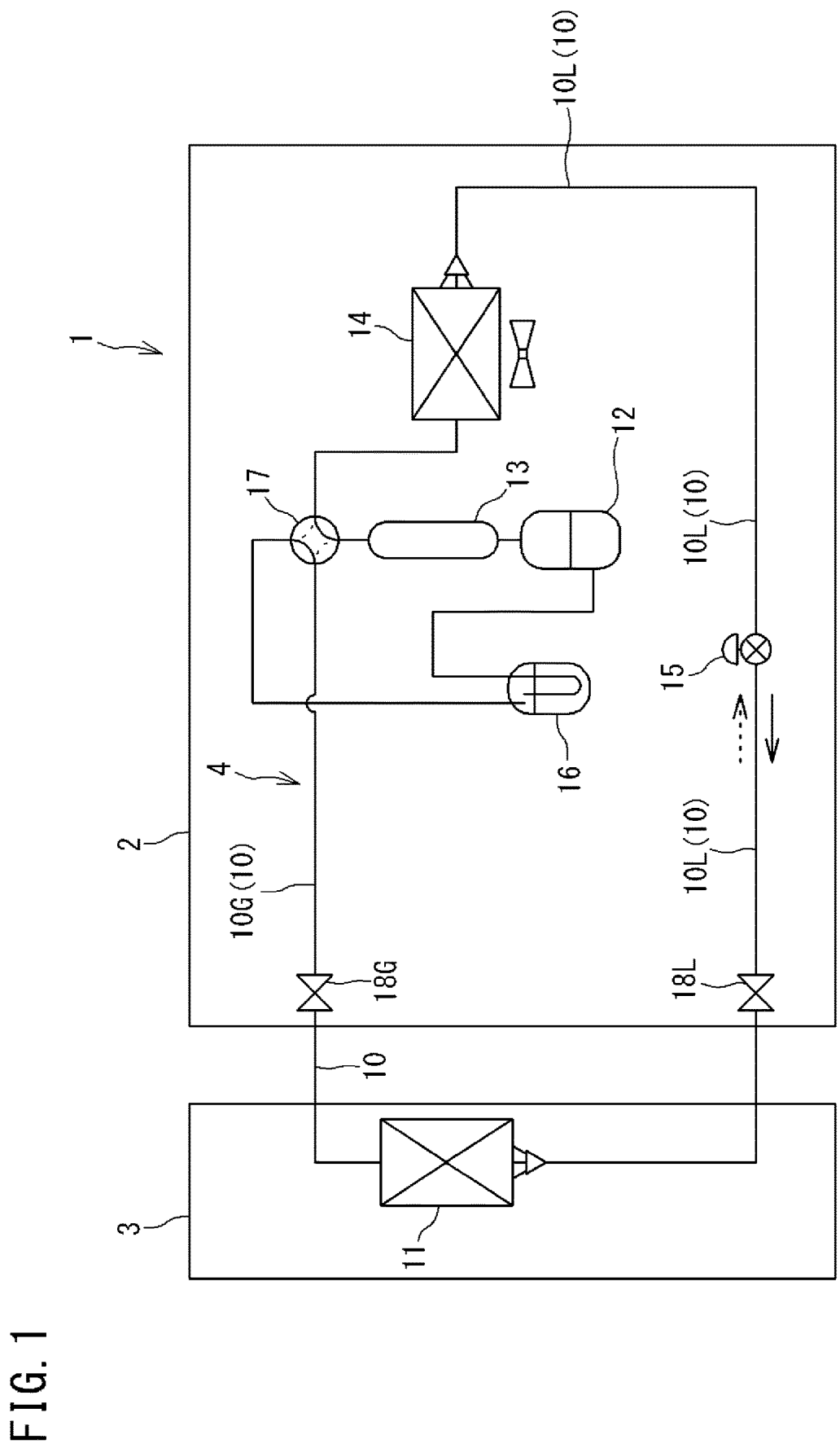
FIG. 1 is a schematic configuration diagram of a refrigeration apparatus including a refrigerant pipe according to one or more embodiments.

FIG. 1 is a schematic configuration diagram of a refrigeration apparatus including a refrigerant pipe according to one or more embodiments.

A refrigeration apparatus 1 is, for example, an air conditioner that adjusts indoor temperature and humidity, and includes an outdoor unit 2 installed outdoors and an indoor unit 3 installed indoor. The outdoor unit 2 and the indoor unit 3 are connected to each other by a refrigerant pipe 10.

The refrigeration apparatus 1 includes a refrigerant circuit 4 that performs a vapor compression refrigeration cycle. The refrigerant circuit 4 includes a plurality of element components and a refrigerant pipe 10 connecting the plurality of element components. The refrigerant circuit 4 includes, as element components, an indoor heat exchanger 11, a compressor 12, a muffler 13, an outdoor heat exchanger 14, an expansion mechanism 15, an accumulator 16, a four-way switching valve 17, shutoff valves 18L and 18G, and the like, which are connected by the refrigerant pipe 10. The refrigerant pipe 10 includes a liquid pipe 10L and a gas pipe 10G. The liquid pipe 10L and the gas pipe 10G are provided with the shutoff valves 18L and 18G, respectively.

The indoor heat exchanger 11 is provided in the indoor unit 3 and exchanges heat between refrigerant and indoor air. As the indoor heat exchanger 11, for example, a cross-fin fin-and-tube heat exchanger, a microchannel heat exchanger, or the like can be adopted. An indoor fan (not shown) that blows indoor air to the indoor heat exchanger 11 and sends conditioned air to the room is provided near the indoor heat exchanger 11.

The compressor 12, the muffler 13, the outdoor heat exchanger 14, the expansion mechanism 15, the accumulator 16, the four-way switching valve 17, and the shutoff valves 18L and 18G are provided in the outdoor unit 2. The compressor 12 compresses refrigerant sucked from a suction pipe and discharges the refrigerant from a discharge pipe. As the compressor 12, for example, various compressors such as a scroll compressor can be adopted.

The muffler 13 suppresses pressure pulsation of the refrigerant discharged from the compressor 12. Instead of or in addition to the muffler 13, an oil separator may be provided between the discharge pipe of the compressor 12 and the four-way switching valve 17. The oil separator separates lubricating oil from a mixed fluid of the lubricating oil and the refrigerant discharged from the compressor 12.

The outdoor heat exchanger 14 exchanges heat between the refrigerant and the outdoor air. As the outdoor heat exchanger 14, for example, a cross-fin fin-and-tube heat exchanger, a microchannel heat exchanger, or the like can be adopted. An outdoor fan that sends the outdoor air to the outdoor heat exchanger 14 is provided near the outdoor heat exchanger 14.

The expansion mechanism 15 is disposed between the outdoor heat exchanger 14 and the indoor heat exchanger 11 in the refrigerant pipe 10 of the refrigerant circuit 4, and expands the inflowing refrigerant to decompress the refrigerant to a predetermined pressure. As the expansion mechanism 15, for example, an electronic expansion valve with a variable opening degree or a capillary tube can be employed.

The accumulator 16 is disposed between a suction port of the compressor 12 and the four-way switching valve 17 in the refrigerant circuit 4, and separates the flowing refrigerant into gas and liquid. The gas refrigerant separated in the accumulator 16 is sucked into the compressor 12.

The four-way switching valve 17 can be switched between a first state indicated by a solid line and a second state indicated by a broken line in FIG. 1. When the refrigeration apparatus 1 performs a cooling operation, the four-way switching valve 17 is switched to the first state, and when the refrigeration apparatus 1 performs a heating operation, the four-way switching valve 17 is switched to the second state.

[Configuration of Refrigerant Pipe]

Figure 2:
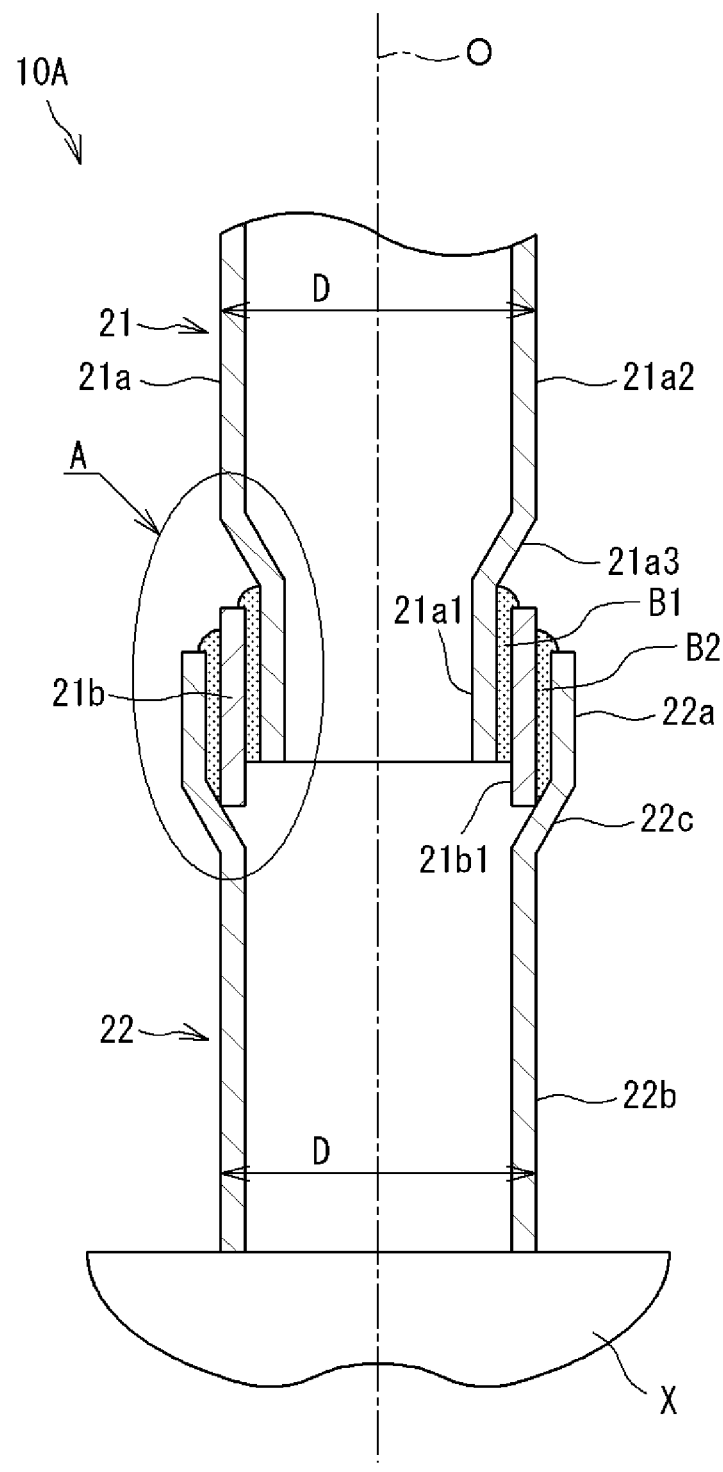
FIG. 2 is a sectional view illustrating a connected portion between a first pipe and a second pipe of the refrigerant pipe.

FIG. 2 is a sectional view illustrating a connected portion between a first pipe and a second pipe of a refrigerant pipe.

A refrigerant pipe 10A illustrated in FIG. 2 is connected to at least one element component X among the plurality of element components described above. The refrigerant pipe 10A includes a first pipe 21 and a second pipe 22. The first pipe 21 and the second pipe 22 have an identical axis O. In one or more embodiments, the axis O is disposed in an up-down direction (vertical direction). In the following description, a direction along the axis O is also referred to as a "pipe axial direction". A radial direction around the axis O is also referred to as a "pipe radial direction".

(First Pipe)

The first pipe 21 includes a pipe body 21a and a connection pipe 21b. The pipe body 21a and the connection pipe 21b are separate members.

The pipe body 21a includes stainless steel. The pipe body 21a includes, for example, SUS304, SUS304L, SUS436L, SUS430, or the like.

The pipe body 21a has a first large diameter portion 21a2, a first step portion 21a3, and a first small diameter portion 21a1 arranged in the pipe axial direction. In an example illustrated in FIG. 2, the first small diameter portion 21a1 is disposed at one end (lower part) of the pipe body 21a in the pipe axial direction. The first step portion 21a3 is disposed above the first small diameter portion 21a1. The first large diameter portion 21a2 is disposed above the first step portion 21a3.

In the pipe body 21a, the first small diameter portion 21a1 and the first step portion 21a3 are formed by reducing one end in the pipe axial direction of the pipe having an outer diameter D in the pipe radial direction, and a part where a diameter of the pipe is not reduced is defined as the first large diameter portion 21a2.

The connection pipe 21b includes a material different from a material of the pipe body 21a. The connection pipe 21b according to one or more embodiments includes copper. The "copper" described herein is "pure copper" containing copper as a main component in an amount of 99.9 wt % or more. The connection pipe 21b is a straight pipe having a constant outer diameter and inner diameter. A length of the connection pipe 21b in the pipe axial direction is shorter than a length of the pipe body 21a in the pipe axial direction. The length of the connection pipe 21b in the pipe axial direction is longer than a length of the first small diameter portion 21a1 of the pipe body 21a in the pipe axial direction. The inner diameter of the connection pipe 21b is slightly larger than an outer diameter of the first small diameter portion 21a1.

The first small diameter portion 21a1 of the pipe body 21a is inserted inside the connection pipe 21b in the pipe radial direction. An inner peripheral surface of the connection pipe 21b and an outer peripheral surface of the first small diameter portion 21a1 are disposed to face each other in the pipe radial direction. The inner peripheral surface of the connection pipe 21b and the outer peripheral surface of the first small diameter portion 21a1 are brazed with a first brazing material B1. In FIG. 2 and FIGS. 3 to 11 described below, a thickness of the first brazing material B1 in the pipe radial direction is exaggerated in order to clearly show the brazed portion. The same applies to a second brazing material B2 described later.

Figure 3:
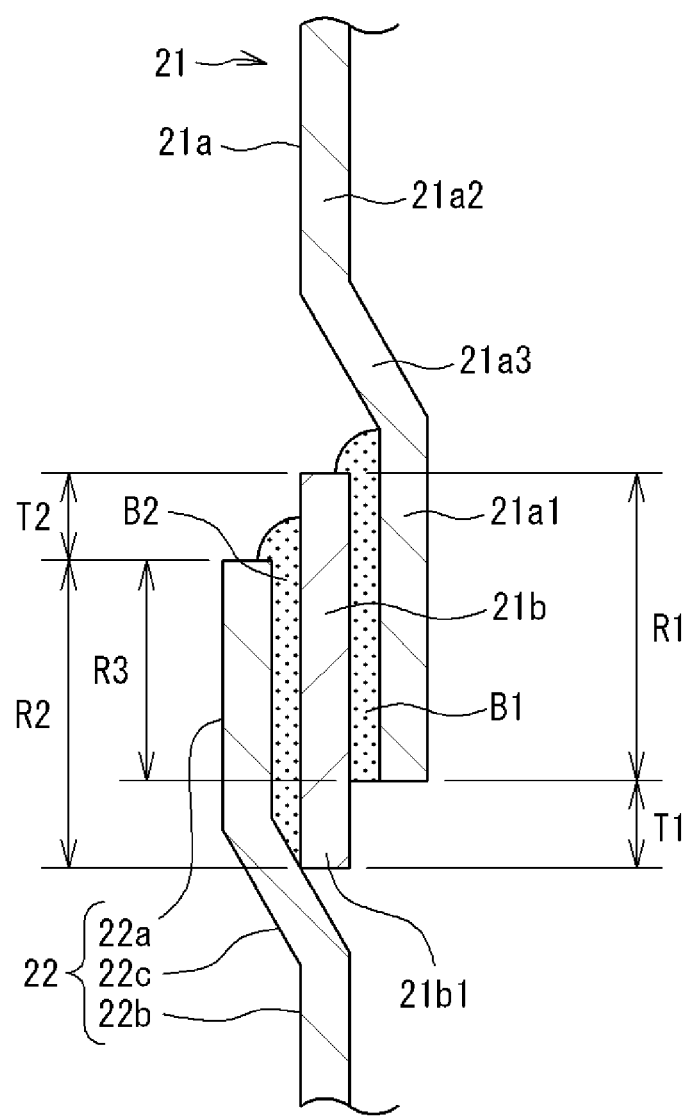
FIG. 3 is an enlarged sectional view of a portion A in FIG. 2.

FIG. 3 is an enlarged view of the portion A in FIG. 2.

The inner peripheral surface of the connection pipe 21b and the outer peripheral surface of the first small diameter portion 21a1 are connected to each other by "in-furnace brazing". This is for the following reason.

First, since a passive film (oxide film) is formed on a surface of stainless steel as the material of the pipe body 21a, a flux for removing the oxide film is required to perform manual brazing (hereinafter, also referred to as "hand brazing") such as torch brazing. Since the refrigerant flows in the refrigerant circuit 4 as a closed circuit, if the flux remains in the refrigerant pipe 10A, the flux may be mixed in the refrigerant, and the mixture may adversely affect performance of the refrigerant or the element component X (for example, the compressor 12) into which the refrigerant flows. Therefore, an operation of removing the flux after brazing is required.

The stainless steel as a material of the pipe body 21a causes embrittlement called sensitization when heated. Sensitization is a phenomenon in which chromium binds to carbon in stainless steel, and the chromium is precipitated at a grain boundary, and thus a part having a low chromium component is generated to reduce corrosion resistance or the like. A temperature range in which the sensitization is likely to occur and an application time of the heat are known.

The in-furnace brazing is a method of performing brazing in a predetermined gas atmosphere, for example, a hydrogen gas atmosphere capable of removing an oxide film inside a continuous furnace or the like. It is therefore possible to braze the stainless steel without using a flux. This eliminates the need for removing the flux after brazing. In the in-furnace brazing, it is easy to manage a brazing temperature and a brazing time, and thus the brazing can be performed at a temperature and time that can suppress occurrence of sensitization. By using SUS304L having a smaller carbon amount than SUS304, as the pipe body 21a, sensitization of the pipe body 21a can be suppressed.

The connection pipe 21b has a protrusion 21b1 protruding in the pipe axial direction from the first small diameter portion 21a1 as an end of the pipe body 21a. A protrusion amount T1 of the protrusion 21b1 is, for example, 0.1 mm or more and 25 mm or less. The protrusion amount T1 may be 1.0 mm or more and 5.0 mm or less. The protrusion amount T1 may be 2.0 mm or more and 3.0 mm or less. The protrusion amount T1 according to one or more embodiments is smaller than an overlap amount R1 of the pipe body 21a and the connection pipe 21b in the pipe radial direction. The overlap amount R1 is, for example, 7.0 mm (Second Pipe)

As illustrated in FIGS. 2 and 3, the second pipe 22 is connected to one end of the first pipe 21 in the pipe axial direction. The second pipe 22 protrudes from the element component X such as the compressor 12, constitutes a part of the element component X, and constitutes a part of the refrigerant pipe 10A. The second pipe 22 according to one or more embodiments includes a material different from the pipe body 21a of the first pipe 21 and the same as the connection pipe 21b. The second pipe 22 according to one or more embodiments includes copper.

The second pipe 22 has a second large diameter portion 22a, a second step portion 22c, and a second small diameter portion 22b arranged in the pipe axial direction. The second large diameter portion 22a is disposed at one end (upper part) of the second pipe 22 in the pipe axial direction. The second small diameter portion 22b is disposed at the other end (lower part) of the second pipe 22 in the pipe axial direction. A lower end of the second small diameter portion 22b is directly connected to the element component X. The second step portion 22c is disposed between the second large diameter portion 22a and the second small diameter portion 22b.

In the second pipe 22, the second large diameter portion 22a and the second step portion 22c are formed by enlarging one end of a pipe having the outer diameter D in the pipe radial direction, and a part where a diameter is not enlarged is defined as the second small diameter portion 22b.

The second large diameter portion 22a is disposed such that an opening faces upward. An inner diameter of the second large diameter portion 22a is slightly larger than the outer diameter of the connection pipe 21b in the first pipe 21. The connection pipe 21b of the first pipe 21 is inserted inside the second large diameter portion 22a in the pipe radial direction. An inner peripheral surface of the second large diameter portion 22a and an outer peripheral surface of the connection pipe 21b are arranged to face each other in the pipe radial direction. The protrusion 21b1 of the connection pipe 21b is in contact with the second step portion 22c of the second pipe 22.

The inner peripheral surface of the second large diameter portion 22a and the outer peripheral surface of the connection pipe 21b are brazed with the second brazing material B2. This brazing is manual brazing such as torch brazing (burner brazing). Since the connection pipe 21b of the first pipe 21 and the second pipe 22, both of which include copper, can be easily connected by brazing using an inexpensive brazing material such as phosphor copper brazing.

The first pipe 21 and the second pipe 22 are relatively positioned in the pipe axial direction by the protrusion 21b1 of the connection pipe 21b being in contact with the second step portion 22c of the second pipe 22. Accordingly, the brazing can be performed more easily.

As illustrated in FIG. 3, the connection pipe 21b overlaps the second pipe 22 in the pipe radial direction in a range indicated by R2. This overlap amount R2 has substantially the same dimension as the overlap amount R1 between the connection pipe 21b and the pipe body 21a. The connection pipe 21b protrudes from the second pipe 22 in the pipe axial direction. The protrusion amount T2 of the connection pipe 21b is smaller than the overlap amount R2. The protrusion amount T2 is, for example, 2 mm or more and 3 mm or less.

A lower end of the pipe body 21a of the first pipe 21 and an upper end of the second pipe 22 overlap each other in the pipe radial direction. An overlap amount R3 between the pipe body 21a and the second pipe 22 is, for example, 5.0 mm. The connection pipe 21b is placed under a high-temperature environment in a furnace during brazing with the pipe body 21a. Thus, a strength of the connection pipe 21b may decrease due to coarsening of crystal grains of copper. In one or more embodiments, since the pipe body 21a and the second pipe 22 are disposed to overlap each other in the pipe radial direction, the connection pipe 21b having a reduced strength does not exist alone in the refrigerant pipe 10A. In other words, the connection pipe 21b overlaps at least one of the pipe body 21a or the second pipe 22 in the pipe radial direction. Therefore, a decrease in the strength of the connection pipe 21b is compensated by the pipe body 21a and the second pipe 22.

In one or more embodiments, the connection pipe 21b of the first pipe 21 has the protrusion 21b1 protruding from the pipe body 21a in the pipe axial direction. However, in FIG. 3, assuming that the connection pipe 21b is shorter in the pipe axial direction and the connection pipe 21b is retracted upward without protruding from the pipe body 21a, there will be a slight space between the second large diameter portion 22a of a second pipe 22 and the lower end of the first small diameter portion 21a1 of the first pipe 21 in the pipe radial direction, and the overlap amount R2 between a connection pipe 21b and a second pipe 22 will be also reduced. Therefore, there is a possibility that a connection strength between the connection pipe 121b and the second pipe 122 decreases.

In one or more embodiments, as shown in FIG. 3, since the connection pipe 21b has the protrusion 21b1 protruding from the pipe body 21a in the pipe axial direction, there is no space between the second pipe 22 and the first pipe 21, the overlapping amount R2 between the connection pipe 21b and the second pipe 22 is also increased, and the connection strength between the first pipe 21 and the second pipe 22 can be increased.

The second brazing material B2 having a melting point lower than a melting point of the first brazing material B2 is used. Thus, for example, when the element component X is replaced, by heating the connected portion between the first pipe 21 and the second pipe 22 at a temperature higher than the melting point of the second brazing material B2 and lower than the melting point of the first brazing material B1, only the second brazing material B2 is melted without melting the first brazing material B1, and the second pipe 22 can be removed from the first pipe 21. Therefore, in the first pipe 21, the connection pipe 21b remains connected to the pipe body 21a, and the second pipe 22 of the new element component X can be connected to the connection pipe 21b.

The first large diameter portion 21a2 of the first pipe 21 and the second small diameter portion 22b of the second pipe 22 have the same outer diameter D. Therefore, in a manufacturing process of the refrigeration apparatus 1, jigs used for fixing, holding, and handling the pipes can be made common. When an inner diameter of the first large diameter portion 21a2 and an inner diameter of the second small diameter portion 22b are common, pressure fluctuation of the refrigerant flowing through the refrigerant pipe 10A can be reduced.

The pipe body 21a of the first pipe 21 includes stainless steel and has a higher strength than the second pipe 22 including copper. Therefore, a wall thickness of the pipe body 21a can be made thinner than a wall thickness of the second pipe 22. In this case, since the inner diameter of the first large diameter portion 21a2 of the pipe body 21a is larger than the inner diameter of the second small diameter portion 22b of the second pipe 22, it is slightly disadvantageous in terms of suppressing the pressure fluctuation of the refrigerant, but it is possible to reduce a weight of the refrigerant pipe 10A and facilitate processing of the refrigerant pipe 10A.

Figure 4:
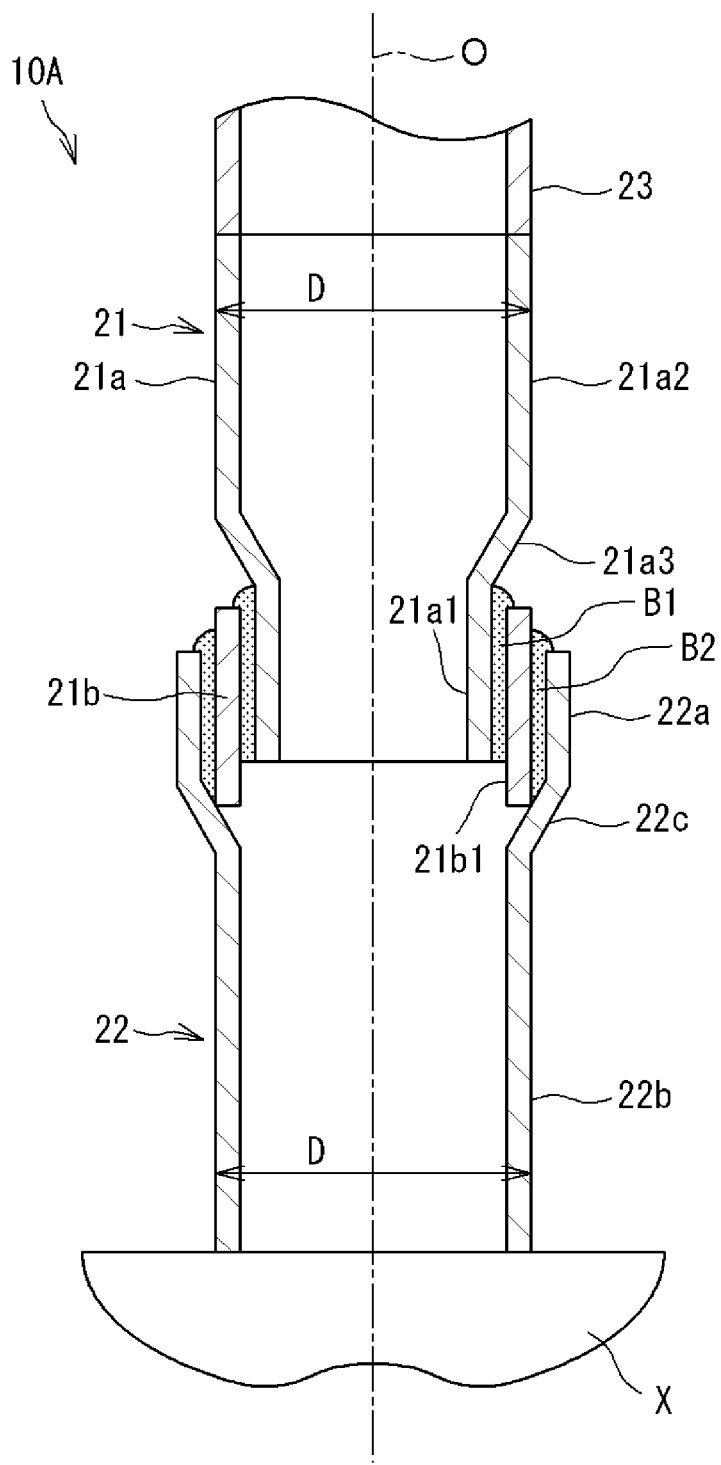
FIG. 4 is a sectional view illustrating a connected portion between a first pipe and a second pipe of a refrigerant pipe according to one or more embodiments.

FIG. 4 is a sectional view illustrating a connected portion between a first pipe and a second pipe of a refrigerant pipe according to one or more embodiments.

The refrigerant pipe 10A according to one or more embodiments includes a third pipe 23 in addition to the first pipe 21 and the second pipe 22. The third pipe 23 has the same axis O as the first pipe 21 and the second pipe 22.

The first pipe 21 according to one or more embodiments is shorter in the pipe axial direction than the first pipe 21 according to the above-described embodiments. The first pipe 21 is disposed between the second pipe 22 and the third pipe 23 in the pipe axial direction. Therefore, the first pipe 21 according to one or more embodiments has a function as a joint that connects the second pipe 22 and the third pipe 23 to each other.

The third pipe 23 is connected to the first large diameter portion 21a2 of the pipe body 21a of the first pipe 21. The third pipe 23 includes stainless steel which is the same material as the pipe body 21a. The pipe body 21a and the third pipe 23 are connected to teach other by welding such as TIG welding. Alternatively, the pipe body 21a and the third pipe 23 may be connected to each other by brazing. The third pipe 23 has a same outer diameter D as the first large diameter portion 21a2 of the pipe body 21a.

In the first pipe 21 in the refrigerant pipe 10A according to the above-described embodiments, since the first large diameter portion 21a2 of the pipe body 21a is longer in the pipe axial direction, the first pipe 21 increases in size, and is complicated to handle during in-furnace brazing between the pipe body 21a and the connection pipe 21b. In the first pipe 21 according to one or more embodiments, the pipe body 21a is shorter, and the first pipe 21 itself is used as a "joint" connecting the second pipe 22 and the third pipe 23 to each other. Thus, the first pipe 21 is downsized, and in-furnace brazing can be easily performed. In addition, by downsizing the first pipe 21, the number of first pipes 21 that can be introduced into the furnace at a time can be increased, and thus production efficiency can be improved.

Figure 5:
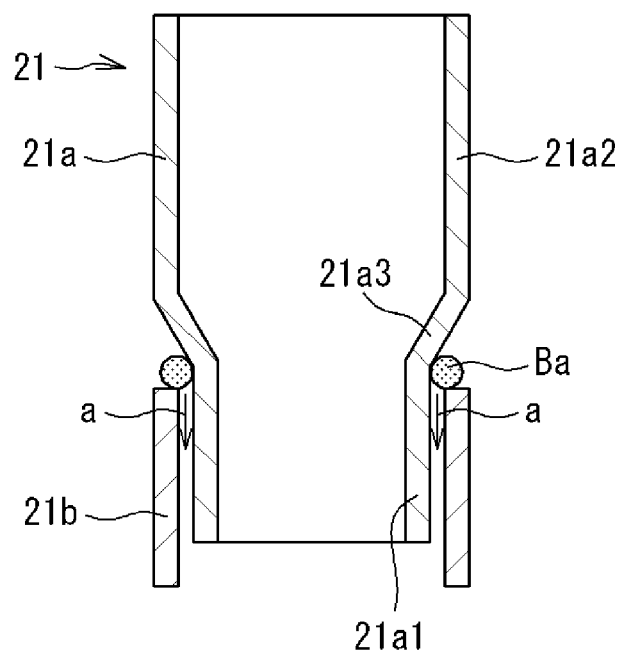
FIG. 5 is a sectional view illustrating a state before brazing of a pipe body and a connection pipe of the first pipe.

FIG. 5 is a sectional view illustrating a state before brazing of the pipe body and the connection pipe of the first pipe.

In one or more embodiments, in order to braze the pipe body 21a and the connection pipe 21b, first, a ring brazing filler metal Ba to be the first brazing material B1 is fitted to outside of the first small diameter portion 21a1 of the pipe body 21a in the pipe radial direction. Next, the connection pipe 21b is fitted to the outside of the first small diameter portion 21a1 in the pipe radial direction, and the ring brazing filler metal Ba is sandwiched between the connection pipe 21b and the first step portion 21a3. With the pipe body 21a above and the connection pipe 21b below, the pipe body 21a and the connection pipe 21b are put into a high-temperature furnace to melt the ring brazing filler metal Ba, and as indicated by an arrow a, the first brazing material B1 is poured into a gap between the outer peripheral surface of the first small diameter portion 21a1 and the inner peripheral surface of the connection pipe 21b.

In this manner, by sandwiching the ring brazing filler metal Ba between the connection pipe 21b and the first step portion 21a3, brazing can be performed in a state where the connection pipe 21b, the pipe body 21a, and the ring brazing filler metal Ba are relatively positioned. In addition, when the first pipe 21 is longer as in the above-described embodiments, the first pipe 21 can be put into the furnace only in a lateral orientation, but when the first pipe 21 is downsized as in one or more embodiments, brazing can be performed in a state where the axis of the first pipe 21 (the pipe body 21a and the connection pipe 21b) is oriented in the up-down direction as described above. Thus, the first brazing material B1 can be uniformly poured into the gap between the outer peripheral surface of the first small diameter portion 21a1 and the inner peripheral surface of the connection pipe 21b.

(Modification of Pipe Body 21a)

FIGS. 6A, 6B, and 6C are sectional views illustrating a modification of the pipe body.

In the modification illustrated in FIGS. 6A to 6C, an end 23a of the third pipe 23 is inserted inside the first large diameter portion 21a2 formed in the pipe body 21a of the first pipe 21, and the first large diameter portion 21a2 and the third pipe 23 are connected to each other by welding.

In an example illustrated in FIG. 6A, the pipe body 21a of the first pipe 21 and the third pipe 23 are circumferentially welded at one area in the pipe axial direction, indicated by Y1. This welding area Y1 is located at a tip of the first large diameter portion 21a2. The welding is performed on an outer periphery of the first large diameter portion 21a2 at the welding area Y1, and then, the first large diameter portion 21a2 and the third pipe 23 are melted and connected to each other.

The welding area Y1 is located at an end of the first pipe 21 opposite to the second pipe 22 in a range where the pipe body 21a of the first pipe 21 and the third pipe 23 overlap each other in the pipe radial direction. In other words, the welding area Y1 is located closer to atmosphere (outside of the refrigerant pipe 10A) in the range where the pipe body 21a of the first pipe 21 and the third pipe 23 overlap each other in the pipe radial direction. Therefore, the welding can be easily performed while a connection state between the pipe body 21a of the first pipe 21 and the third pipe 23 are confirmed. Furthermore, as compared with a case where a butted portion between the pipe body 21a and the third pipe 23 is welded as in the embodiments illustrated in FIG. 4, in the present modification, a region of welding can be widened, a strength of a connected portion between the pipe body 21a and the third pipe 23 can be increased, and a structure withstanding large stress can be obtained.

In an example illustrated in FIG. 6B, the pipe body 21a of the first pipe 21 and the third pipe 23 are circumferentially welded at two areas in the pipe axial direction, indicated by Y1 and Y2. These welding areas Y1 and Y2 are located at both ends of the first large diameter portion 21a2 in the pipe axial direction.

As illustrated in FIG. 6A, when the first large diameter portion 21a2 and the third pipe 23 are connected to each other only at the welding area Y1, if a minute movement occurs at the end 23a of the third pipe 23 due to a flow of the refrigerant in the refrigerant pipe 10A or the like, stress may concentrate near a boundary between the first large diameter portion 21a2 and the first step portion 21a3. Therefore, in the example shown in FIG. 6B, by connecting the first large diameter portion 21a2 and the third pipe 23 to each other also at the welding area Y2, the movement of the third pipe 23 can be restricted, and stress concentration generated in the pipe body 21a of the first pipe 21 can be suppressed.

In an example illustrated in FIG. 6C, as in the example illustrated in FIG. 6A, the end 23a of the third pipe 23 is inserted inside the first large diameter portion 21a2 formed in the pipe body 21a of the first pipe 21, and the first large diameter portion 21a2 and the third pipe 23 are connected to each other by welding. The first large diameter portion 21a2 according to the present modification is shorter in the pipe axial direction than the first large diameter portion 21a2 illustrated in FIG. 6A, and the pipe body 21a of the first pipe 21 and the third pipe 23 are welded to each other circumferentially at one area Y3 in the pipe axial direction. In the present modification, since the first large diameter portion 21a2 is shorter, an entire range of the first large diameter portion 21a2 in the pipe axial direction can be connected to the third pipe 23 by welding at one location Y3.

In each example shown in FIGS. 6A to 6C, by forming the first small diameter portion 21a1 of the pipe body 21a shorter in the pipe axial direction or forming the connection pipe 21b longer in the pipe axial direction, the end of the connection pipe 21b may abut on the first step portion 21a3 to position the connection pipe 21b in the pipe axial direction with respect to the pipe body 21a.

FIGS. 7A to 9 are sectional views illustrating further modifications of the pipe body.

In an example illustrated in FIG. 7A, the pipe body 21a of the first pipe 21 is constituted by a straight pipe having a constant outer diameter. On the other hand, the third pipe 23 includes a third small diameter portion 23a1, a third large diameter portion 23a2, and a third step portion 23a3. The third small diameter portion 23a1 is disposed at the end of the third pipe 23 and is inserted into the pipe body 21a. The pipe body 21a and the third pipe 23 are circumferentially welded at one area Y4 in the pipe axial direction. This welding is performed over an entire range of the third small diameter portion 23a1 in the pipe axial direction.

In an example illustrated in FIG. 7B, the pipe body 21a of the first pipe 21 is constituted by a straight pipe having a constant outer diameter. The third pipe 23 is also constituted by a straight pipe having at least an end whose outer diameter is the same as the pipe body 21a. The pipe body 21a and the third pipe 23 are welded on a butted surface Y5.

Figure 8A:
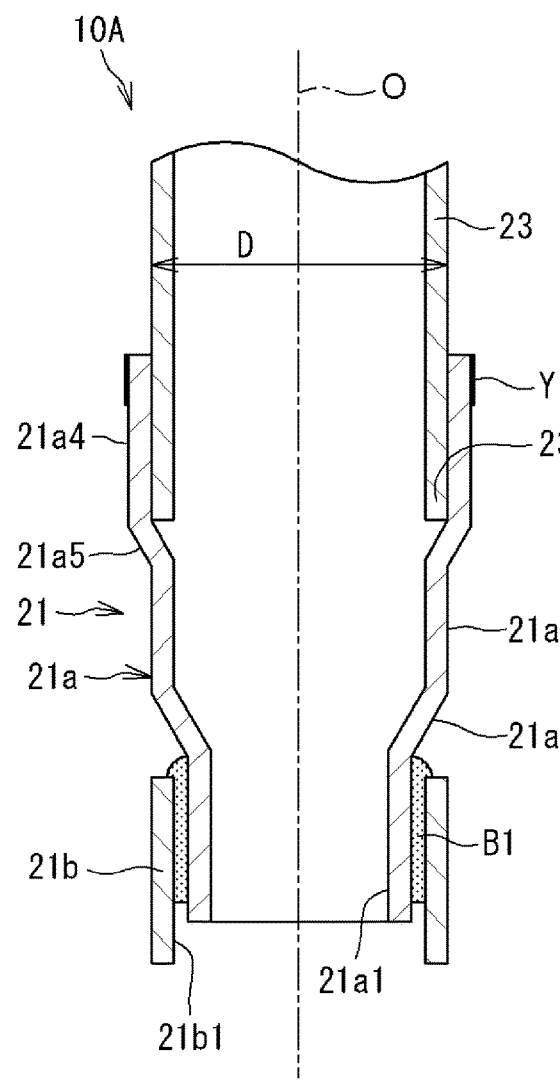
FIGS. 8A and 8B are sectional views illustrating a further modification of the pipe body.
Figure 8B:
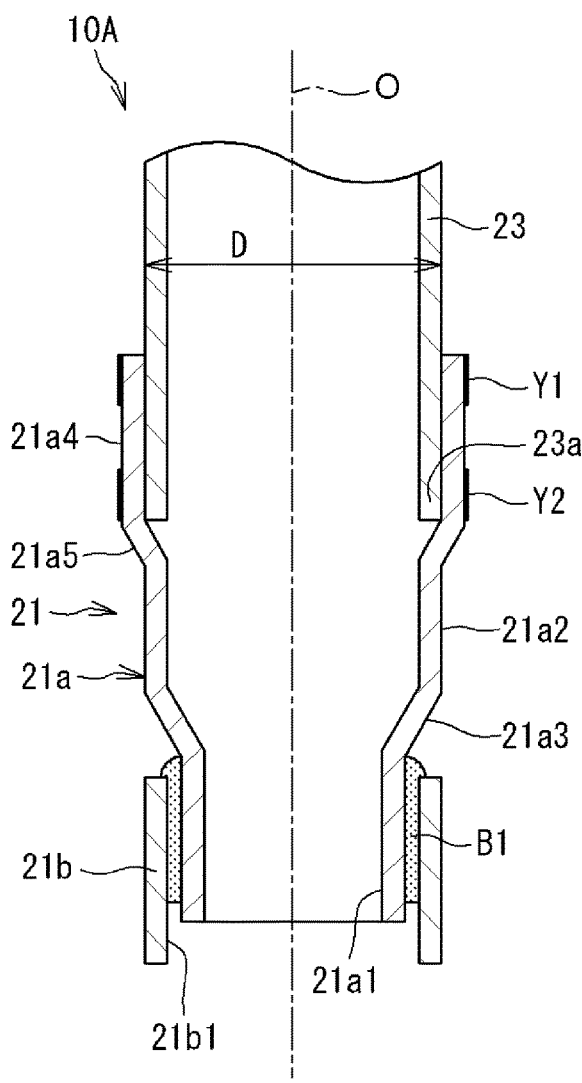

In the modification illustrated in FIGS. 8A and 8B, a fourth large diameter portion 21a4 having a diameter larger than the diameter of the first large diameter portion 21a2 and a fourth step portion 21a5 disposed between the first large diameter portion 21a2 and the fourth large diameter portion 21a4 are formed in the pipe body 21a of the first pipe 21. The end of the third pipe 23 is inserted into the fourth large diameter portion 21a4, and the fourth large diameter portion 21a4 and the third pipe 23 are connected to each other by welding.

In an example illustrated in FIG. 8A, the fourth large diameter portion 21a4 of the first pipe 21 and the third pipe 23 are circumferentially welded at one area, indicated by Y1 in the pipe axial direction. The welding area Y1 is located at a tip of the fourth large diameter portion 21a4. The welding is performed on an outer periphery of the fourth large diameter portion 21a4 at the welding area Y1, and then, the fourth large diameter portion 21a4 and the third pipe 23 are melted and connected to each other.

The welding area Y1 is located at an end of the first pipe 21 opposite to the second pipe 22 in a range where the pipe body 21a of the first pipe 21 and the third pipe 23 overlap each other in the pipe radial direction. In other words, the welding area Y1 is located closer to atmosphere (outside of the refrigerant pipe 10A) in the range where the pipe body 21a of the first pipe 21 and the third pipe 23 overlap each other in the pipe radial direction. Therefore, the welding can be easily performed while a connection state between the pipe body 21a of the first pipe 21 and the third pipe 23 are confirmed. Furthermore, as compared with a case where a butted portion between the pipe body 21a and the third pipe is welded as in the embodiments illustrated in FIG. 4, in the present modification, a region of welding can be widened, a strength of a connected portion between the pipe body 21a and the third pipe can be increased, and a structure withstanding large stress can be obtained.

In an example illustrated in FIG. 8B, the pipe body 21a of the first pipe 21 and the third pipe 23 are circumferentially welded at two areas in the pipe axial direction, indicated by Y1 and Y2. These welding areas Y1 and Y2 are located at both ends of the fourth large diameter portion 21a4 in the pipe axial direction.

As illustrated in FIG. 8A, when the fourth large diameter portion 21a4 and the third pipe 23 are connected to each other only at the welding area Y1, if a minute movement occurs at the end 23a of the third pipe 23 due to a flow of the refrigerant in the refrigerant pipe 10A or the like, stress may concentrate near a boundary between the fourth large diameter portion 21a4 and the fourth step portion 21a5. Therefore, in the example shown in FIG. 8B, by connecting the fourth large diameter portion 21a4 and the third pipe 23 to each other also at the welding area Y2, the movement of the third pipe 23 can be restricted, and stress concentration generated in the first pipe 21 can be suppressed.

Figure 9:
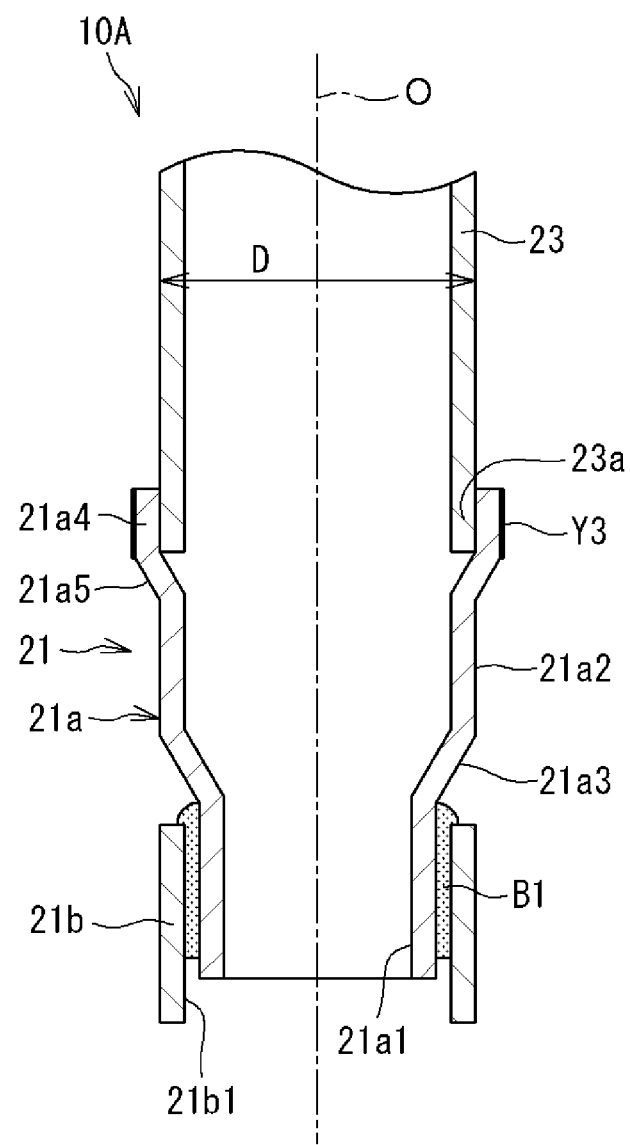
FIG. 9 is a sectional view illustrating a further modification of the pipe body.

In an example illustrated in FIG. 9, similarly to the example illustrated in FIGS. 8A and 8B, the fourth large diameter portion 21a4 and the fourth step portion 21a5 are formed in the pipe body 21a of the first pipe 21. The third pipe 23 is inserted into the fourth large diameter portion 21a4, and the fourth large diameter portion 21a4 and the third pipe 23 are connected to each other by welding. The fourth large diameter portion 21a4 according to the present modification is shorter in the pipe axial direction than the fourth large diameter portion 21a4 illustrated in FIGS. 8A and 8B, and the first pipe 21 and the third pipe 23 are welded to each other circumferentially at one area Y3 in the pipe axial direction. In the present modification, since the fourth large diameter portion 21a4 is shorter, an entire range of the fourth large diameter portion 21a4 in the pipe axial direction can be connected to the third pipe 23 by welding at one location Y3.

Figure 10:
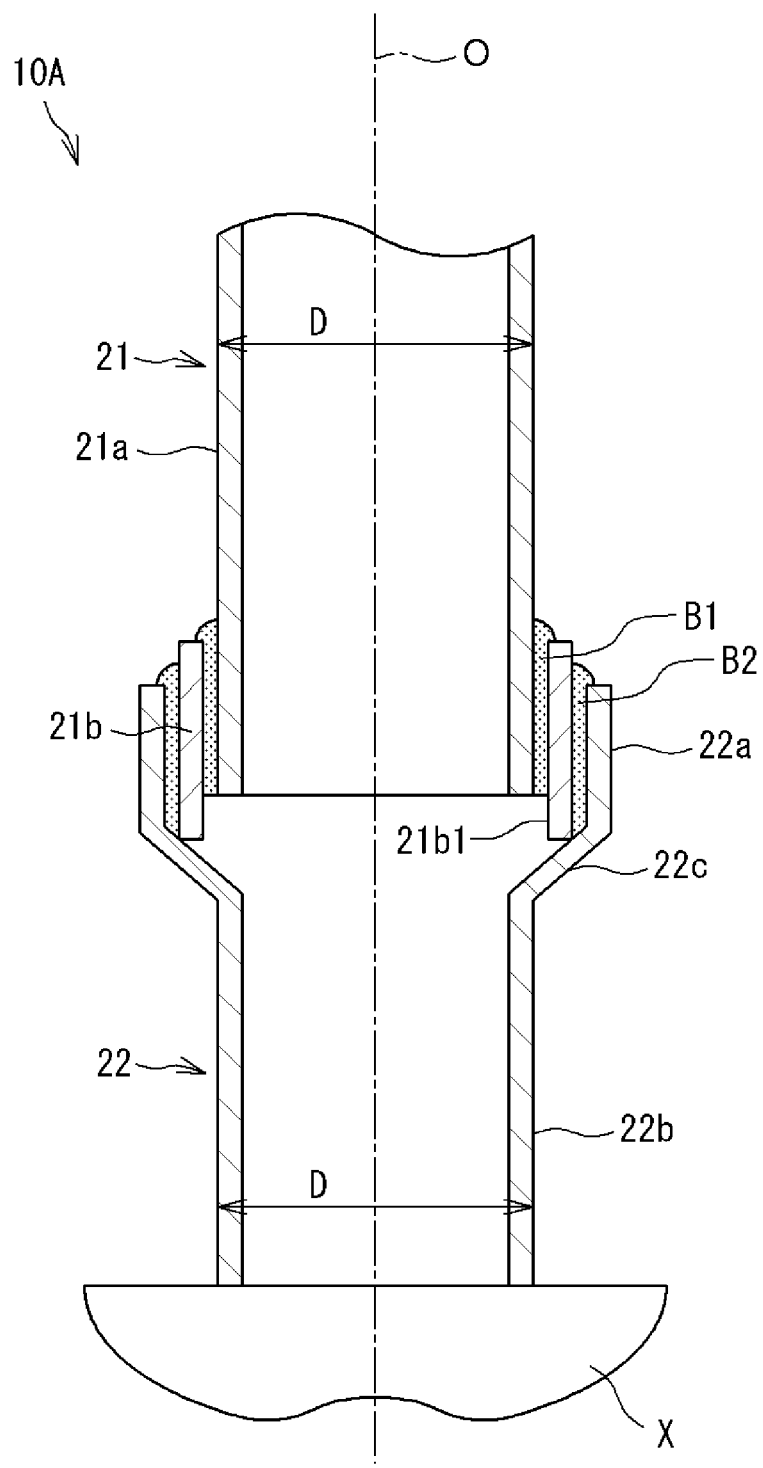
FIG. 10 is a sectional view illustrating a connected portion between a first pipe and a second pipe of a refrigerant pipe according to one or more embodiments.

FIG. 10 is a sectional view illustrating a connected portion between a first pipe and a second pipe of a refrigerant pipe according to one or more embodiments.

In the refrigerant pipe 10A according to one or more embodiments, a structure of the first pipe 21 is different from the above-described embodiments. The pipe body 21a of the first pipe 21 has a constant inner diameter and outer diameter D, and does not include the first large diameter portion, the first small diameter portion, and the first step portion as in the above-described embodiments.

One or more embodiments produce functional effects substantially similar to those of the above-described embodiments. Since the first small diameter portion 21a1 is unnecessary in the first pipe 21, there is an advantage that processing is facilitated. However, in one or more embodiments, it is necessary to enlarge the outer diameter of the second large diameter portion 22a of the second pipe 22 to be larger than in the above-described embodiments, and it becomes difficult to process the second pipe 22.

Figure 11:
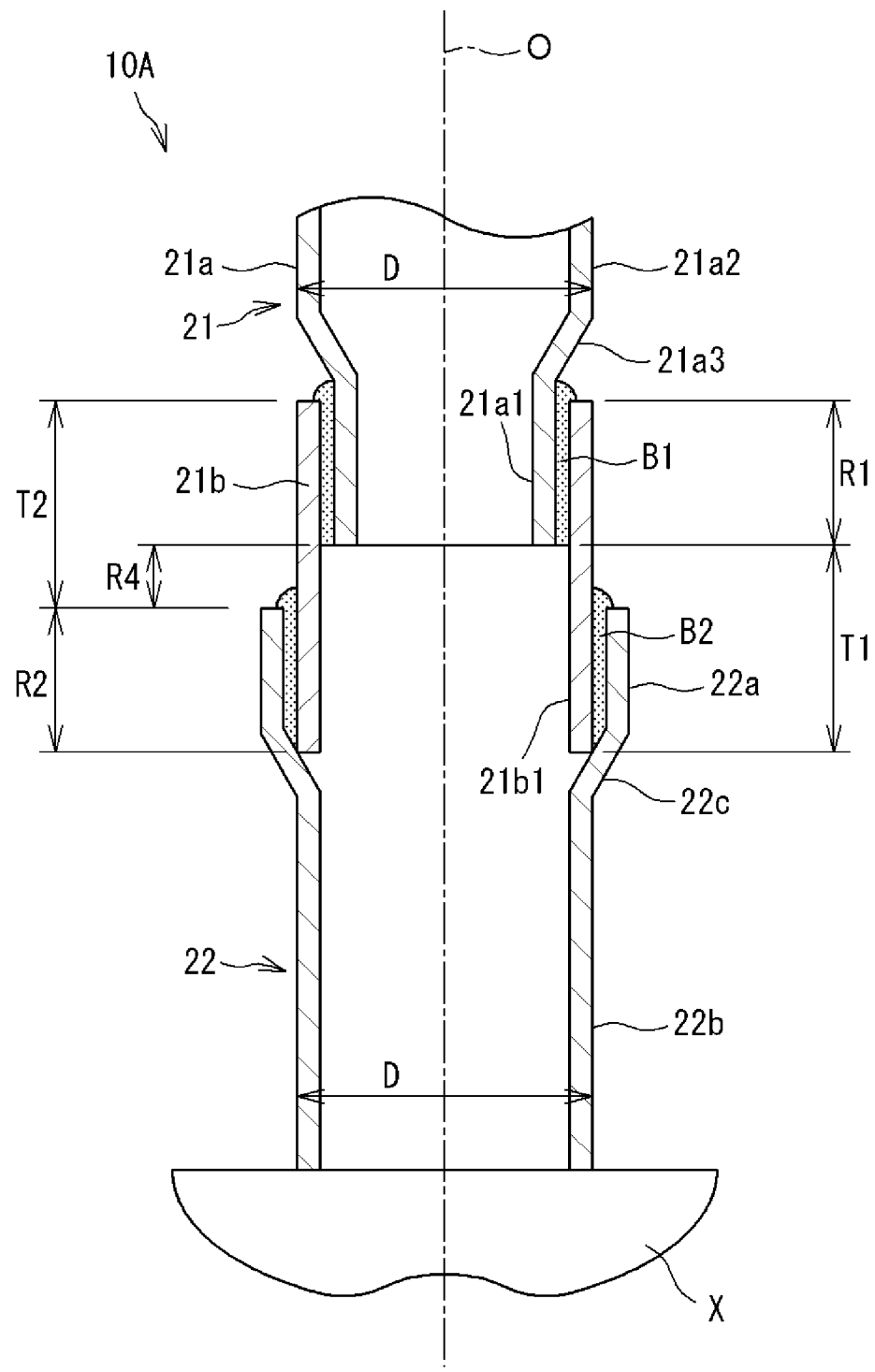
FIG. 11 is a sectional view illustrating a connected portion between a first pipe and a second pipe of a refrigerant pipe according to one or more embodiments.

FIG. 11 is a sectional view illustrating a connected portion between a first pipe and a second pipe of a refrigerant pipe according to one or more embodiments.

In the refrigerant pipe 10A according to one or more embodiments, a structure of the first pipe 21 is different from the above-described embodiments. In the connection pipe 21b of the first pipe 21, the protrusion amount T1 of the protrusion 21b1 protruding from the pipe body 21a in the pipe axial direction is larger than the overlap amount R1 with the pipe body 21a. The protrusion amount T1 of the protrusion 21b1 is larger than the overlap amount R2 of the connection pipe 21b and the second pipe 22 in the pipe axial direction. Therefore, the refrigerant pipe 10A according to one or more embodiments has a region R4 in which the connection pipe 21b alone exists midway in the pipe axial direction.

One or more embodiments produce functional effects substantially similar to those of the above-described embodiments. However, the refrigerant pipe 10A according to one or more embodiments has the region R4 in which the connection pipe 21b having a possibility of strength reduction due to in-furnace brazing exists alone.

Other Embodiments

In one or more embodiments, the connection pipe 21b of the first pipe 21 and the second pipe 22 include copper. However, these pipes need not include copper, but the material can be appropriately changed. For example, the connection pipe 21b of the first pipe 21 and the second pipe 22 can include a copper alloy. A copper alloy is an alloy in which other metals or non-metals are added to copper as a main component to improve properties of copper. Like copper, a copper alloy is a member that does not require a flux treatment or the like and is easily brazed. As the copper alloy, for example, a copper alloy containing copper in an amount of 98 wt % or more is employed. As the copper alloy, a copper alloy containing copper in an amount of 99 wt % or more may be employed.

The connection pipe 21b of the first pipe 21 and the second pipe 22 only have to include materials having the same main component. Thus, one of the connection pipe 21b of the first pipe 21 or the second pipe 22 may include copper and the other may include a copper alloy, in addition to a case where both include copper or a case where both include a copper alloy. When both the connection pipe 21b of the first pipe 21 and the second pipe 22 include a copper alloy, components other than the main component may be different from each other. That is, the connection pipe 21b and the second pipe 22 may include different materials having the same main component. In this case, both can be brazed without using flux.

The connection pipe 21b of the first pipe 21 and the second pipe 22 can include aluminum or an aluminum alloy. In the present specification, "aluminum" is "pure aluminum" containing 99.9 wt % or more of aluminum as a main component. The aluminum alloy is an alloy in which other metals or non-metals are added to aluminum as a main component to improve properties of aluminum. As the aluminum alloy, for example, an aluminum alloy containing 95 wt % or more of aluminum is employed. Both the connection pipe 21b of the first pipe 21 and the second pipe 22 may include aluminum, both of the pipes may include an aluminum alloy, or one of the pipes may include aluminum and the other pipe may include an aluminum alloy. When both the connection pipe 21b of the first pipe 21 and the second pipe 22 include an aluminum alloy, components other than the main component may be different.

The materials such as copper, a copper alloy, aluminum, and an aluminum alloy, which are widely used as the second pipe 22 constituting a part of the element component X, can be used to form the connection pipe 21b of the first pipe 21 and then produce the refrigerant pipe 10A having high versatility in terms of connection with the second pipe 22.

Although the second pipe 22 according to each of the embodiments is provided in the element component X and constitutes a part of the element component X, the second pipe 22 may simply constitute only the refrigerant pipe 10A. The first pipe 21 may constitute a part of the element component X.

Operation and Effects of Embodiments

In the refrigeration apparatus, when a refrigerant pipe including stainless steel is used as a part of the refrigerant circuit, an operation of manually brazing the refrigerant pipe including stainless steel and the refrigerant pipe including copper may occur during manufacturing the refrigeration apparatus or during maintenance such as part replacement. However, brazing of a stainless steel refrigerant pipe requires work such as removal of an oxide film on a surface, and thus the work becomes complicated. One or more embodiments of the present disclosure facilitate connection between a refrigerant pipe including stainless steel and a refrigerant pipe including a material other than stainless steel.

Operation and Effects (1) The refrigerant pipe 10A according to each of the embodiments includes the first pipe 21 and the second pipe 22. The first pipe 21 includes the pipe body 21a including stainless steel and the connection pipe 21b provided at an end of the pipe body 21a in the pipe axial direction and including a material different from stainless steel. The connection pipe 21b has the protrusion 21b1 protruding in the pipe axial direction from the end of the pipe body 21a. The second pipe 22 includes the same material as the connection pipe 21b. The second pipe 22 includes the second large diameter portion 22a disposed at an end in the pipe axial direction, the second small diameter portion 22b having a diameter smaller than the second large diameter portion 22a, and the second step portion 22c disposed between the second large diameter portion 22a and the second small diameter portion 22b. The connection pipe 21b is inserted into the second large diameter portion 22a. The protrusion 21b1 is in contact with the second step portion 22c. The outer peripheral surface of the connection pipe 21b is connected to the inner peripheral surface of the second large diameter portion 22a.

In refrigerant pipe 10A having the above configuration, brazing of stainless steel is unnecessary for connection between the first pipe 21 and the second pipe 22, and the first pipe 21 and the second pipe 22 can be easily connected. The stainless steel as the material of the pipe body 21a of the first pipe 21 is less expensive than copper or the like as the material of the second pipe 22. Therefore, the refrigerant pipe 10A according to one or more embodiments can be produced at a lower cost than a refrigerant pipe as a whole including copper.

(2) The refrigerant pipe 10A according to one or more embodiments described above includes the first pipe 21 and the second pipe 22, and the first pipe 21 includes the pipe body 21a including stainless steel and the connection pipe 21b provided at an end of the pipe body 21a in the pipe axial direction and including a material different from stainless steel. The connection pipe 21b has the protrusion 21b1 protruding in the pipe axial direction from the end of the pipe body 21a. The second pipe 22 includes a material having the same main component as the main component of the material of the connection pipe 21b, and includes the second large diameter portion 22a disposed at an end in the pipe axial direction, the second small diameter portion 22b having a diameter smaller than the second large diameter portion 22a, and the second step portion 22c disposed between the second large diameter portion 22a and the second small diameter portion 22b. The connection pipe 21b is inserted into the second large diameter portion 22a. The protrusion 21b1 is in contact with the second step portion 22c. The outer peripheral surface of the connection pipe 21b is connected to the inner peripheral surface of the second large diameter portion 22a.

In refrigerant pipe 10A having the above configuration, brazing of stainless steel is unnecessary for connection between the first pipe 21 and the second pipe 22, and the first pipe 21 and the second pipe 22 can be easily connected. The stainless steel as the material of the pipe body 21a of the first pipe 21 is less expensive than copper or the like as the material of the second pipe 22. Therefore, the refrigerant pipe 10A according to one or more embodiments can be produced at a lower cost than a refrigerant pipe as a whole including copper.

(3) In the refrigerant pipe 10A according to one or more embodiments, the connection pipe 21b and the second pipe 22 include different materials having the same main component.

In this case, the first pipe and the second pipe can be still connected to each other easily.

(4) In one or more embodiments, the connection pipe 21b and the second pipe 22 include any one of copper, a copper alloy, aluminum, or an aluminum alloy. Therefore, the first pipe 21 and the second pipe 22 can be easily connected by brazing using an inexpensive brazing material.

(5) In one or more embodiments, the end of the pipe body 21a and the second large diameter portion 22a are disposed to overlap each other in the pipe radial direction. Therefore, in the refrigerant pipe 10A, the connection pipe 21b that may be reduced in strength due to in-furnace brazing does not exist alone, and the pipe body 21a and the second pipe 22 can compensate for the strength reduction of the connection pipe 21b.

(6) In one or more embodiments, the pipe body 21a of the first pipe 21 includes the first small diameter portion 21a1 and the first large diameter portion 21a2 having a diameter larger than a diameter of the first small diameter portion 21a1, and the connection pipe 21b is provided on the outer peripheral surface of the first small diameter portion 21a1. Therefore, as compared with a case where the pipe body 21a of the first pipe 21 is a straight pipe having a constant inner diameter and outer diameter, the diameter of the second large diameter portion 22a of the second pipe 22 does not need to be large in the pipe radial direction, and the processing of the second pipe 22 can be facilitated.

(7) In one or more embodiments, the second small diameter portion 22b of the second pipe 22 and the first large diameter portion 21a2 of the pipe body 21a have the same outer diameter D. Therefore, when the first pipe 21 and the second pipe 22 are connected by brazing or the like or bent in the manufacturing process of the refrigeration apparatus 1, jigs used for fixing, holding, and handling the pipes can be made common.

(8) In one or more embodiments, the second small diameter portion 22b of the second pipe 22 and the first large diameter portion 21a2 of the pipe body 21a have a same inner diameter. Therefore, pressure fluctuation of the refrigerant flowing through the refrigerant pipe 10A can be reduced.

(9) In one or more embodiments, the opening of the second large diameter portion 22a of the second pipe 22 is disposed to face upward. Therefore, the second brazing material B2 can be easily poured between the inner peripheral surface of the second large diameter portion 22a of the second pipe 22 and the outer peripheral surface of the connection pipe 21b of the first pipe 21, and the connection between the first pipe 21 and the second pipe 22 can be facilitated.

(10) In one or more embodiments, the first pipe 21 constitutes a joint that connects the second pipe 22 and another pipe 23 including stainless steel to each other. It is therefore possible to downsize the first pipe 21 and facilitate an operation of providing the connection pipe 21b in the pipe body 21a.

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

REFERENCE SIGNS LIST

1: REFRIGERATION APPARATUS
4: REFRIGERANT CIRCUIT
10: REFRIGERANT PIPE
10A: REFRIGERANT PIPE
12: COMPRESSOR
21: FIRST PIPE
21a: PIPE BODY
21a1: FIRST SMALL DIAMETER PORTION
21a2: FIRST LARGE DIAMETER PORTION
21a3: FIRST STEP PORTION
21b: CONNECTION PIPE
21b1: PROTRUSION
22: SECOND PIPE
22a: SECOND LARGE DIAMETER PORTION
22b: SECOND SMALL DIAMETER PORTION
23: THIRD PIPE
D: OUTER DIAMETER
X: ELEMENT COMPONENT

What is claimed is:

1. A refrigerant pipe that constitutes a refrigerant circuit of a refrigeration apparatus, the refrigerant pipe comprising:
   a first pipe; and
   a second pipe, wherein
   the first pipe comprises:
      a pipe body made of stainless steel; and
      a connection pipe, made of a material different from stainless steel, disposed at an end of the pipe body in a pipe axial direction,
   the connection pipe comprises a protrusion protruding in the pipe axial direction from the end of the pipe body,
   the second pipe comprises:
      a second-pipe large diameter portion, made of a material that is a same as the material of the connection pipe, disposed at an end in the pipe axial direction;
      a second-pipe small diameter portion having a smaller diameter than the second-pipe large diameter portion; and
      a step portion disposed between the second-pipe large diameter portion and the second-pipe small diameter portion,
   the connection pipe is inserted into the second-pipe large diameter portion,
   the protrusion contacts the step portion, the connection pipe comprises an outer peripheral surface connected to an inner peripheral surface of the second-pipe large diameter portion, the connection pipe is disposed on an outer peripheral surface of the pipe body, and a portion of each of the pipe body, the connection pipe, and the second-pipe large diameter portion radially overlap one another.

2. The refrigerant pipe according to claim 1, wherein the connection pipe and the second pipe are made of any of copper, a copper alloy, aluminum, or an aluminum alloy.

3. The refrigerant pipe according to claim 1, wherein the end of the pipe body overlaps the second-pipe large diameter portion in a pipe radial direction.

4. The refrigerant pipe according to claim 1, wherein the pipe body comprises:
   a pipe-body small diameter portion; and
   a pipe-body large diameter portion having a larger diameter than the pipe-body small diameter portion, and
the connection pipe is disposed on an outer peripheral surface of the pipe-body small diameter portion.

5. The refrigerant pipe according to claim 4, wherein the second-pipe small diameter portion and the pipe-body large diameter portion have a same outer diameter.

6. The refrigerant pipe according to claim 4, wherein the second-pipe small diameter portion and the pipe-body large diameter portion have a same inner diameter.

7. The refrigerant pipe according to claim 1, wherein the second-pipe large diameter portion has an opening that faces upward.

8. The refrigerant pipe according to claim 1, wherein the second pipe is part of an element component constituting the refrigerant circuit.

9. The refrigerant pipe according to claim 8, wherein the element component is a compressor.

10. The refrigerant pipe according to claim 1, wherein the first pipe constitutes a joint that connects the second pipe to another pipe made of stainless steel.

11. A refrigeration apparatus comprising:
   the refrigerant pipe according to claim 1; and
   an element component that constitutes a refrigerant circuit and to which the refrigerant pipe is connected.

12. A refrigerant pipe that constitutes a refrigerant circuit of a refrigeration apparatus, the refrigerant pipe comprising:
   a first pipe; and
   a second pipe, wherein
   the first pipe comprises:
      a pipe body made of stainless steel; and
      a connection pipe, made of a material different from stainless steel, disposed at an end of the pipe body in a pipe axial direction,
   the connection pipe comprises a protrusion protruding in the pipe axial direction from the end of the pipe body,
   the second pipe comprises:
      a second-pipe large diameter portion, made of a material that includes a main component same as a main component of the material of the connection pipe, disposed at an end in the pipe axial direction;
      a second-pipe small diameter portion having a smaller diameter than the second-pipe large diameter portion; and
      a step portion disposed between the second-pipe large diameter portion and the second-pipe small diameter portion,
   the connection pipe is inserted into the second-pipe large diameter portion,
   the protrusion contacts the step portion,
   the connection pipe comprises an outer peripheral surface connected to an inner peripheral surface of the second-pipe large diameter portion,
   the connection pipe is disposed on an outer peripheral surface of the pipe body, and
   a portion of each of the pipe body, the connection pipe, and the second-pipe large diameter portion radially overlap one another.

13. The refrigerant pipe according to claim 12, wherein the second pipe is made of a material different from the material of the connection pipe, and
a main component of the second pipe is a same as a main component of the connection pipe.

* * * * *